United States Patent [19]

Ikegami et al.

[11] 4,454,242

[45] Jun. 12, 1984

[54] CATALYST FOR POLYMERIZATION OF OLEFINS

[75] Inventors: Tadashi Ikegami; Katsuhiko Takaya, both of Kurashiki, Japan

[73] Assignee: Asahi Kasei Kogyo Kabushiki Kaisha, Osaka, Japan

[21] Appl. No.: 381,118

[22] Filed: May 24, 1982

[30] Foreign Application Priority Data

Jun. 1, 1981 [JP] Japan ................................. 56-82455

[51] Int. Cl.$^3$ ............................................... C08F 4/64
[52] U.S. Cl. ..................................... 502/113; 526/114
[58] Field of Search ............... 252/429 B, 429 C, 430; 502/113

[56] References Cited

U.S. PATENT DOCUMENTS 3,277,070 10/1966 Weynbergh et al. ............ 252/430 X
3,884,832 5/1975 Pullukat et al. .................. 252/429 C
4,128,500 12/1978 Hwang et al. ....................... 252/430

Primary Examiner—Patrick Garvin
Attorney, Agent, or Firm—Sprung, Horn, Kramer & Woods

[57] ABSTRACT

A catalyst suitable for use in the polymerization of olefins is disclosed. This catalyst contains:

[A] a solid catalyst component obtained by calcining (a) a zirconium compound represented by the general formula:

$$Zr(OR^0)_n A_{4-n}$$

wherein $R^0$ is a hydrocarbon group having 1 to 20 carbon atoms; A is a halogen atom, a carboalkoxy group, a carboxyl group, an acylalkenate, or a hydrocarbon group having 1 through 20 carbon atoms; and n is a number of 0 through 4; and (b) a chromium compound, supported on an inorganic oxide carrier;

[B] an organometallic compound component.

26 Claims, No Drawings

CATALYST FOR POLYMERIZATION OF OLEFINS

The present invention relates to a catalyst suitable for use in the production of olefin, especially ethylene, polymers, or copolymers, by polymerization of ethylene, or components containing, as a main constituent, ethylene. More specifically, it relates to a supported catalyst having a high activity and capable of providing ethylene polymers or copolymers (hereinafter referred to as "an ethylene polymer," for brevity) having an excellent melt flowability and environmental stress cracking resistance (E.S.C.R.).

It is known in the art that ethylene is polymerized by using a so-called Phillips catalyst, i.e., a solid catalyst obtained by supporting chromium oxide on a carrier including silica, alumina, silica-alumina, thoria, and zirconia, followed by heating under an oxygen atmosphere. When this catalyst is used in the polymerization of ethylene, the molecular weight of the ethylene polymer depends on the polymerization temperature. Generally speaking, a polymerization temperature of from 100° to 200° C. is required in order to obtain ethylene polymers having a molecular weight suitable for use in molding (i.e. a molecular weight of 50000-100000). Polymerization at such a temperature range unadvantageously results in an increase in the viscosity of the polymerization mixture and a decrease in the yield of ethylene polymers.

For instance, U.S. Pat. No. 3,622,521 and British Pat. Nos. 1,334,662 and 1326167 disclose a Phillips catalyst modified with a titanium compound, which catalyst is capable of adjusting the molecular weight of the resultant polymer and also increasing the E.S.C.R. of the resultant polymer.

Furthermore, U.S. Pat. No. 3,351,623 discloses a catalyst obtained by mixing (1) an oxide component comprising a mixture of a silica component, chromium oxide, and a substance selected from silica, alumina, zirconia, thoria, with at least the chromium portion being in the state of six valences at the time of initial contact with a monomer or monomers, (2) RxM wherein R is a hydrogen atom, or an alkyl, aryl, cycloalkyl, or alkoxy group having not more than 12 carbon atoms, M is selected from Al, Ga, In, Ta, Zn, B, Pb, Li, Zr, Co, Mg, or Sn, and x has a valency of M, and (3) a vanadium component. Various other improved catalysts have been proposed.

An object of the present invention is to provide a catalyst suitable for use in the polymerization of olefins, which catalyst has a high activity and is capable of producing olefin polymers having an excellent melt flowability and E.S.C.R.

Other objects and advantages of the present invention will be apparent from the description set forth hereinbelow.

In accordance with the present invention, there is provided a catalyst for polymerizing olefins comprising:
(A) a solid catalyst component obtained by calcining
(a) a zirconium compound represented by the general formula:

$$Zr(OR^0)_n A_{4-n}$$

wherein $R^0$ is a hydrocarbon group having 1 to 20 carbon atoms; A is a halogen atom, a carboalkoxy group, a carboxyl group, an acylalkenate, or a hydrocarbon group having 1 through 20 carbon atoms; and n is a number of 0 through 4; and (b) a chromium compound, supported on an inorganic oxide carrier;
(B) an organometallic compound component.

The catalyst according to the present invention has the following remarkable advantageous features:
(1) the activity of the catalyst, in terms of the production amount of polymer per catalyst, is high and a catalyst residue treatment step can be omitted;
(2) the melt flowability, especially the swelling ratio of the resultant polymer, is good; and
(3) the E.S.C.R. of the resultant polymer is good.

The inorganic oxide carriers usable in the present invention include, for example, silica, alumina and silica-alumina. The preferred inorganic oxide carrier is silica. Of the silica carriers, those having a specific surface area of 200 through 600 m$^2$/g, determined by the BET method, a specific pore volume of 1 through 2 ml/g and an average diameter of 50 through 300 Å are especially preferable in the practice of the present invention.

The zirconium compounds usable in the present invention are those having the general formula:

$$Zr(OR^0)_n A_{4-n}$$

wherein $R^0$ is a hydrocarbon group having 1 to 20 carbon atoms, A is a halogen atom, a carboalkoxy group desirably having 1 to 20 carbon atoms, a carboxyl group desirably having 1 to 20 carbon atoms, an acylalkenate desirably having 2 to 20 carbon atoms, or a hydrocarbon group having 1 through 20 carbon atoms, and n is a number of 0 through 4. A desirable group $R^0$ is a hydrocarbon group, such as methyl, ethyl, propyl, butyl, amyl, hexyl, phenyl, or tolyl and a desirable group A is chlorine. Example of the zirconium compounds are the alkoxides, such as $Zr(OC_3H_7)_4$, and $Zr(OC_4H_9)_4$, the phenates, such as $Zr(OC_6H_5)_4$, $Zr[OZr(OC_2H_5)_3]_4$, $Zr(CH_3COO)_4$, $Zr(C_2H_4)_2$, zirconium acetylacetonate, $Zr(OC_4H_9)_3Cl$, $Zr(OC_4H_9)_2Cl_2$, $Zr(OC_4H_9)Cl_3$, $ZrCl_4$, and $Zr(CH_3COCH_2COCH_3)_4$.

These zirconium compounds can be used alone, in any mixtures thereof, or in any other mixtures containing said zirconium compound. Of these zirconium compounds, alkoxy-containing zirconium compounds can be desirably used in the catalyst of the present invention. The especially desirable zirconium compounds are zirconium tetraalkoxides, specifically $Zr(On-Bu)_4$. For instance, commercially available $Zr(On-Bu)_4$ provides a good result.

The amount of the zirconium compounds supported on the carrier is generally 0.01 through 15% by weight, desirably 0.1 through 10% by weight and more desirably 0.2 through 8% by weight, based on the weight of the carrier.

The chromium compounds usable in the present invention include, for example, chromium trioxide ($CrO_3$) or compounds which can at least partially produce chromium trioxide. Examples of such compounds are t-butyl chromate, chromium nitrate, chromium carbonate, chromium acetate, chromium oxalate, ammonium chromate, chromyl chloride, and chromium acetylacetonate. Chromium trioxide, chromium acetate, or chromium acetylacetonate provides a desirable result.

The amount of the chromium compounds supported on the carrier is desirably 0.01 through 10% by weight, more desirably 0.1 through 5% by weight, based on the weight of the carrier. Furthermore, a weight ratio of the zirconium compound to the chromium compound of 0.01 through 100, desirably 0.2 through 50, provides a good result.

There is no critical order in the reaction of the inorganic oxide carrier and the chromium compound or zirconium compound. For instance, either of prior supporting of the chromium compound on the carrier, prior supporting of the zirconium compound on the carrier, or simultaneous supporting of the chromium compound and zirconium compound can be adopted in the preparation of the catalyst of the present invention.

The supporting of the zirconium compound and the chromium compound on the inorganic oxide carrier can be carried out in any conventional manner. For instance, the inorganic oxide carrier substance is impregnated with a zirconium compound and/or chromium compound solution, followed by either vaporization of the solvent or filtration. Furthermore, the inorganic oxide carrier and the zirconium compound (and/or the chromium compound) are heated and sublimated on to the carrier. In addition, an aqueous or non-aqueous medium can be used, depending upon the types of the chromium compounds. For example, chromium oxide can be supported from an aqueous solution thereof and chromium acetylacetonate can be supported from a non-aqueous solution thereof, for example, in toluene.

The supported solid obtained above is calcined and activated. This activation is generally carried out in the presence of oxygen. It is especially important that the water content of the atmosphere be low when the supported solid is calcined. The water content of the atmosphere should be 20 ppm or less, desirably 10 ppm or less, and more desirably 5 ppm or less. The calcination can be carried out under an inert gas atmosphere or under a reduced pressure. However, calcination is preferably carried out under an oxidizing atmosphere, such as air. The activation of the supported solid by calcination is carried out under the conditions of 300° through 900° C., desirably 400° through 800° C., and 0.5 through 10 hours, according to these activation conditions. Sufficient removal of the water contained in the supported solid prior to the calcination process. This is because when water contacts the solid catalyst activated by calcination, deactivation of the solid catalyst is caused. Therefore, the activated solid catalyst content should not be allowed to contact.

The organometallic compounds usable as an organometallic compound in the present invention include organomagnesium compounds, organozinc compounds, organoaluminum compounds, organoboron compounds, and mixtures of organomagnesium compounds and organoaluminum compounds. The combined use of the organomagnesium compounds and the organoaluminum compounds results in a desired melt flowability. The desirable ratio of the organoaluminum compounds to the organomagnesium compounds is 0.05 through 50 moles, especially 0.1 through 10 moles, to one mol of the organomagnesium compounds.

The organomagnesium compound component usable in the present invention includes hydrocarbon-soluble organomagnesium compounds having the general formula:

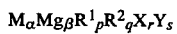

wherein M is an element selected from aluminum, boron, beryllium, zinc or lithium; $R^1$ and $R^2$ are the same or different hydrocarbon groups having 1 to 20 carbon atoms; X and Y are the same or different groups selected from $OR^3$; $OSiR^4R^5R^6$, $NR^7R^8$, or $SR^9$ wherein $R^3$, $R^4$, $R^5$, $R^6$, $R^7$, and $R^8$ each independently is a hydrogen atom, or a hydrocarbon group having 1 to 20 carbon atoms, and $R^9$ is a hydrocarbon group having 1 to 20 carbon atoms; $\alpha \geq 0$, $\beta > 0$ and p, q, r, and s are each a number zero or greater than zero, but p and q are not simultaneously zero, and $p+q+r+s = m\alpha + 2\beta$ wherein m has a valency of M.

In the above-mentioned general formula, examples of the hydrocarbon groups represented by $R^1$ through $R^9$ are alkyl groups, desirably having 1 to 20 carbon atoms, cycloalkyl groups, desirably having 3 to 10 carbon atoms, or aryl groups, desirably having 6 to 20 carbon atoms. Typical examples of such groups are methyl, ethyl, propyl, butyl, amyl, hexyl, decyl, cyclohexyl, and phenyl groups. Especially, $R^1$ is desirably an alkyl group, $R^3$ through $R^8$ may be a hydrogen atom, and $R^3$ is desirably a hydrogen atom.

In the case of $\alpha > 0$, aluminum, boron, zinc, beryllium and lithium are desirably used as the metal M, since these metals readily from hydrocarbon-soluble organomagnesium complexes. The ratio of magnesium to the metallic atom M (i.e. $\beta/\alpha$) is desirably 0.2 through 10, more desirably 0.5 through 10, although there is no critical limitation of this ratio.

The relationship of $p+q+r+s = m\alpha + 2$ shows the stoichiometry of the organomagnesium compound component. The relationship of $(r+s)/(\alpha+\beta)$, which means a ratio of the total number of X and Y to the total number of the metallic atoms, is generally $0 \leq (r+s)/(\alpha+\beta) < 1.5$, desirably $0 \leq (r+s)/(\alpha+\beta) - 1 < 1.0$, and more desirably $0 \leq (r+s)/(\alpha+\beta) \leq 0.8$.

The above-mentioned organomagnesium complex compounds usable in the present invention are synthesized by reacting an organomagnesium compound represented by the general formula $R^1MgX$ or $R^1{}_2Mg$, wherein $R^1$ is the same as defined above and X is a halogen, with an organometallic compound represented by $MR^2{}_m$ or $MR^2{}_{m-1}H$, wherein M, $R^2$ and m are the same as defined above, at a temperature ranging from room temperature to 150° C. in an inert hydrocarbon solvent, such as hexane, heptane, cyclohexane, benzene, and toluene. Furthermore, the above-mentioned organomagnesium compounds can also be synthesized by the reaction of (i) $MgX_2$ and $MR^2{}_m$ or $MR^2{}_{m-1}H$, or (ii) $R^1MgX$ or $MgR^1{}_2$ and $R^2{}_nMX_{m-n}$ wherein M, $R^1$ and $R^2$ are the same as defined above and n is a number of 0 through m.

In the case of $\alpha = 0$ and $\beta = 0$ in the above-mentioned general formula of the organomagnesium compounds, that is, the hydrocarbon-soluble organomagnesium compounds having the general formula $MgR^1{}_pR^2{}_q$, the following three groups are generally involved:

(a) At least one of $R^1$ and $R^2$ is a secondary or tertially alkyl group having 4 to 6 carbon atoms;

(b) $R^1$ and $R^2$ are alkyl groups having different carbon atoms; and (c) At least one of $R^1$ and $R^2$ is a hydrocarbon group having 6 or more carbon atoms.

Of these three groups, the corresponding following three groups are desirable for use in the present invention, (a') Both $R^1$ and $R^2$ are alkyl groups having 4 to 6 carbon atoms and at least one of $R^1$ and $R^2$ is a secondary or tertially alkyl group.

(b') R¹ is an alkyl group having 2 or 3 carbon atoms and R² is an alkyl group having 4 or more carbon atoms.

(c') Both R¹ and R² are alkyl groups having 6 or more carbon atoms.

Examples of these groups are as follows. The secondary alkyl groups or the tertially alkyl groups having 4 to 6 carbon atoms in the above-mentioned cases (a) and (a') include, for example, sec-$C_4H_9$, tert-$C_4H_9$, —$CH(C_2H_5)_2$, —$C(C_2H_5)(CH_3)_2$, —$CH(CH_3)(C_4H_9)$, —$CH(C_2H_5)(C_3H_7)$, —$C(CH_3)_2(C_3H_7)$, and —$C(CH_3)(C_2H_5)_2$. The desirable group is a secondary alkyl group, especially sec-$C_4H_9$ group.

The alkyl groups having 2 or 3 carbon atoms in the above-mentioned cases (b) and (b') include, for example, ethyl and propyl groups, desirably the ethyl group. The alkyl groups having 4 or more carbon atoms include, for example, butyl, amyl, hexyl and octyl groups, desirably the butyl and hexyl groups.

The hydrocarbon groups having 6 or more carbon atoms in the above-mentioned cases (c) and (c') include, for example, an alkyl group, such as hexyl, octyl, or decyl group, and a phenyl group, desirably a hexyl group.

Examples of the above-mentioned organomagnesium compounds are (sec-$C_4H_9$)$_2$Mg, (tert-$C_4H_9$)$_2$Mg, n-$C_4H_9$-Mg-$C_2H_5$, n-$C_4H_9$-Mg-sec-$C_4H_9$, n-$C_4H_9$-Mg-tert-$C_4H_9$, n-$C_6H_{13}$-Mg-$C_2H_5$, (n-$C_6H_{13}$)$_2$Mg, (n-$C_8H_{17}$)$_2$Mg, and (n-$C_{10}H_{21}$)$_2$Mg.

Examples of X in the above-mentioned general formula are desirably $OR^3$ and $OSiR^4R^5R^6$, and most desirably $OSiR^4R^5R^6$. The ratio of $OR^3$ or $OSiR^4R^5R^6$ to the metallic magnesium atom (i.e. r) is desirably 0.1 through 2 and more desirably 0.2 through 1.5.

The organoaluminum compound components usable in the present invention include, for example, trialkylaluminum compounds, dialkylmonohalides, alkylaluminum sesquihalides, alkylaluminum dihalides, dialkylaluminum monohydrides, and components obtained by reacting and/or mixing these compounds with carbinols and/or silanols or hydrosiloxy compounds. The desirable organoaluminum compound components are trialkylaluminum compounds, dialkylaluminum compounds, and those obtained by reacting and/or mixing these compounds with carbinols and/or silanols or hydroxy compounds.

Examples of the trialkylaluminum compounds are trimethylaluminum, triethylaluminum, tri-n-propylaluminum, tri-iso-propylaluminum, tri-n-butylaluminum, tri-iso-butylaluminum, triamylaluminum, trihexylaluminum, trioctylaluminum, tridecylaluminum, and isoprenylaluminum. These compounds can be used alone or in any mixtures thereof.

The carbinols having 1 to 10 carbon atoms include, for example, methyl alcohol, ethyl alcohol, n- and iso-propyl alcohol, n-, iso- and tert-butyl alcohol, n-, iso-, sec- and tert-amyl alcohol, phenol, and cresol.

The reaction ratio of the carbinol to the organoaluminum compounds, such as trialkylaluminum, is 0.1 through 2 moles, desirably 0.1 through 1.5 moles, and most desirably 0.2 through 1.3 moles, based on 1 mol of trialkylaluminum.

Examples of the silanols usable in the present invention are trimethylsilanol, triethylsilanol, tripropylsilanol, tributylsilanol, and triphenylsilanol.

Hydrozates, of, for example, chlorosilanes and polysilanols, can also be used in the present invention.

Examples of the hydrosiloxy compounds usable in the present invention are as follows.

Methylhydropolysiloxane:

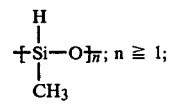

Ethylhydropolysiloxane:

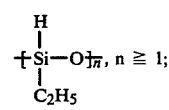

Propylhydrosiloxane:

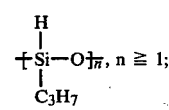

Butylhydrosiloxane:

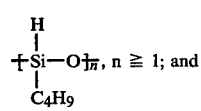

and

Phenylhydrosiloxane:

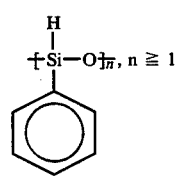

The reaction ratio of the silanols or hydrosiloxy compounds to the organoaluminum compounds, such as trialkylaluminum is 0.05 through 5 moles, desirably 0.1 through 2 moles, and most desirably 0.2 through 1.5 moles, based on 1 mol of the organoaluminum compound.

The organoboron compounds usable in the present invention desirably include, for example, trialkylboron compounds, such as triethylboron, and triisobutyl boron.

The ratio of the component (B) to the component (A) in terms of the metals (gr. atom) in the component (B)/Cr (gr. atom) in the component (A) is generally 0.01 through 3000, desirably 0.1 through 100. The organometallic compound component (B) and the solid catalyst component (A) can be added to a polymerization mixture separately or in the form of a mixture obtained from the previous mixing of the components (A) and (B). The previous contact of the solid catalyst component with a small amount of the organometallic component (B) prior to the addition to the polymerization mixture provides a good result.

The catalyst according to the present invention is suitably used in the polymerization of ethylene, or in the copolymerization of ethylene in which ethylene is a main constituent. Monomers usable in the copolymerization with ethylene are monoolefins or diolefins, having 3 to 12 carbon atoms. Examples of such monomers are propylene, butene-1, pentene-1, 3-methylbutene-1, hexene-1, 4-methylpentene-1, 3-ethylbutene-1, heptene- 1, octene-1, decene-1, butadiene, isoprene, 1,4-hexadiene, 1,5-hexadiene, 1,7-octadiene, dicyclopentadiene, and ethylidene norbornene. One or two of these monomers can be used in the copolymerization.

The density of the ethylene polymers or ethylene copolymers produced by using the present catalyst is approximately 0.91 through 0.97.

The polymerization can be carried out in any conventional manner including a suspension polymerization, a bulk polymerization, a solution polymerization and a gas phase polymerization. When the polymerization reaction is carried out in the presence of an inert organic solvent, hydrocarbon solvents are desirably used. Examples of such organic hydrocarbon solvents are: aliphatic saturated hydrocarbons, such as butane, isobutane, pentane, hexane, heptane, octane, isooctane, decane, and purified kerosene; alicyclic saturated hydrocarbons, such as cyclopentane, cyclohexane, dimethylcyclopentane, and methylcyclohexane; and aromatic hydrocarbons, such as benzene, toluene, and xylene. Desirable hydrocarbon solvents are isobutane, pentane, hexane, heptane, and cyclohexane.

The polymerization may be carried out in the presence of a molecular weight modifier, such as hydrogen, and halogenated hydrocarbons, desirably hydrogen. The amount of the molecular weight modifier can be optionally controlled as required.

The polymerization reaction can be generally carried out at a temperature ranging, for example, from room temperature to approximately 300° C. However, the polymerization conditions depend upon the polymerization pressure, the partial pressure of a monomer, and the kinds and concentrations of the catalyst components. Generally speaking, the polymerization proceeds in a slurry state at a temperature ranging from room temperature through 100° C. and in a solution state at a temperature of 100° through 200° C. The polymerization is desirably carried out in a slurry state. Furthermore, the polymerization may be carried out under a gas phase condition substantially in the absence of an inert organic solvent.

The polymerization can be carried out in a conventional one-stage polymerization method using one reaction zone, or in a so-called multi-stage polymerization method using a plurality of reaction zones. The polymers obtained by using the present catalyst have a wide molecular weight distribution and a relatively high molecular weight, even when obtained by using a one-stage polymerization process, and, therefore, are especially suitable for use in blow molding and film molding. Polymers having a further wide molecular weight distribution can be produced by multi-stage polymerization in which two or more polymerization conditions are used.

The present invention will now be specifically illustrated by, but is by no means limited to, the Examples set forth below.

The term "catalyst efficiency" used in the Examples is defined by an amount of polymer produced in one hour based on 1 g of the solid catalyst. The physical properties in Examples were determined as follows:

(i) Melt index (MI): determined by ASTM-D-1238 (at 190° C., under 2.16 kg load)

$$\text{Flow rate } (FR)^\circ = \frac{MI \text{ (at 190° C., under 21.6 kg load)}}{MI \text{ (at 190° C., under 2.16 kg load)}}$$

°which represents a molecular weight distribution.

(iii) Swelling ratio (SR)** = a weight (g) of a molten polymer strand having a length of 10 cm and discharged from a melt indexer at 190° C. under 21.6 kg load.

** which represents a relative swelling ratio.

EXAMPLE 1

(1) Preparation of a solid catalyst component

One kg of a commercially available silica (Davison 952 manufactured by W. R. Grace & Co., Davison Chemical Division) was added to a solution containing 20 g of chromium trioxide dissolved in 4 liters of distilled water. After stirring for 1 hour at a room temperature, the mixture was heated and dried at a temperature of 100° C.

To the resultant solid, 42.1 g of zirconium tetrabutoxide and 4 liters of n-hexane were added and the mixture was reacted at a temperature of 60° C. for 2 hours. n-Hexane was distilled off under a reduced pressure. The resultant solid was calcinated in a dried air at a temperature of 800° C. for 4 hours. Thus, a solid catalyst component was obtained.

(2) Synthesis of a hydrocarbon-soluble organomagnesium component 13.8 g of di-n-butylmagnesium and 1.9 g of triethylaluminum were charged, together with 100 ml of n-heptane, into a flask purged with nitrogen and reacted at a temperature of 80° C. for 2 hours. Thus, an organomagnesium complex solution was obtained. As a result of analysis, the composition of the complex was $AlMg_{6.0}(C_2H_5)_{3.0}(n-C_4H_9)_{12.1}$ and the concentration of the organometal was 1.20 mol/l.

(3) Synthesis of an organoaluminum compound 22.8 g of triethylaluminum, 430 ml of n-pentane and 12 g of hydromethylsiloxane tetramer were charged into a pressure resistant vessel and reacted at a temperature of 120° C. for 5 hours. The reaction product thus obtained was weighed out and the concentration of aluminum and the concentration of ethane after decomposition were determined. The composition of the reaction product was $Al(C_2H_5)_2-(OSiH.CH_3.C_2H_5)$.

(4) Polymerization of ethylene

Fifty mg of the solid catalyst component obtained in (1) above, 0.05 m mol of the organomagnesium component obtained in (2) above and 0.15 m mol of the organoaluminum obtained in (3) above were charged, together with 1.6 liter of hexane, into an autoclave, which had been dried in vacuo and purged with nitrogen. Ethylene was added in an amount corresponding to a pressure of 10 kg/cm² and hydrogen was added in such an amount that the total pressure becomes 14 kg/cm², while the inside temperature of the autoclave was maintained at 80° C. the polymerization was carried out for 2 hours, while the total inside pressure of the autoclave was maintained at 14 kg/cm² by supplying ethylene. Thus, 356 g of polymer was obtained.

The catalyst efficiency was 3560 g-polyethylene(-PE)/g-solid catalyst·hr, MI of the polymer was 0.12 g/10 min and FR was 270.

The swelling ratio, which represents one characteristics of melt flowability, was determined. As a result, the swelling ratio of the resultant polymer was 0.80, which was remarkably smaller than that (i.e. 1.05) of a polymer obtained from a Phillips catalyst in which no zirconium compound was contained in the above-prepared catalyst.

EXAMPLE 2

Example 1 was repeated, except that an organoaluminum compound obtained in the following manner was used in lieu of the organoaluminum compound synthesized in Example 1.

One hundred and twenty five m moles of triethylaluminum, 200 ml of n-pentane and 125 m moles, in terms of Si, of methylhydropolysiloxane having a viscosity of 50 centistokes were allowed to react with each other at a temperature of 80° C. for 2 hours. As a result of analysis, it was confirmed that the composition of the reaction product was $Al(C_2H_5)_2(OSiHCH_3C_2H_5)$.

The results of the polymerization were as follows:
Yield of polyethylene: 369 g,
Catalyst efficiency: 3690 g-PE/g-solid catalyst hr,
MI: 0.15 g/10 min,
FR: 244.

EXAMPLE 3

(1) Preparation of a solid catalyst component

One kg of a commercially available silica (Davison 952) was mixed with 22 g of zirconium tetrabutoxide and 4 liters of n-hexane. The mixture was allowed to react at a temperature of 60° C. for 2 hours and n-hexane was distilled off under a reduced pressure.

To the resultant solid, 20 g of chromium trioxide and 4 liters of distilled water were added and, after stirring for one hour at a room temperature, the mixture was heated and dried at a temperature of 100° C. The resultant solid was calcinated in a dried air at a temperature of 800° C. for 4 hours. Thus, a solid catalyst component was obtained.

(2) Polymerization of ethylene

Example 1 was repeated except that the solid catalyst component obtained above was used in lieu of that obtained in Example 1.

The results of the polymerization were as follows:
Yield of polyethylene: 320 g,
Catalyst efficiency: 3200 g-PE/g-solid catalyst·hr,
MI: 0.16 g/10 min,
FR: 217.

EXAMPLE 4

One kg of a commercially available silica (Davison 952) was added to a solution of 20 g of chromium trioxide dissolved in 3 liters of distilled water and reacted at a room temperature for 2 hours with stirring. The solid portion was filtered out by means of a glass filter and air dried without washing.

To the solid portion thus obtained, 86 g of zirconium tetrabutoxide and 4 liters of n-hexane were added. The mixture was allowed to react at a temperature of 80° C. for 2 hours and n-hexane was distilled off under a reduced pressure. The resultant solid portion was calcinated at a temperature of 700° C. for 4 hours in a dried air.

The polymerization of ethylene was carried out in the same manner as in Example 1-(4), except that the above-prepared solid catalyst component was used.

The results of the polymerization were as follows:
Yield of polyethylene: 307 g,
Catalyst efficiency: 3070 g-PE/g-solid catalyst·hr,
MI: 0.77 g/10 min,
FR: 140.

EXAMPLE 5

To 50 mg of the solid catalyst component obtained in Example 1, 0.01 m mol of an organomagnesium component $AlMg_{6.0}(n-C_4H_9)_{12}(C_2H_5)_3$ (a 1 mol/l solution in hexane) and 0.01 m mol of an organoaluminum compound $Al(C_2H_5)_2[OSiH(CH_3)—(C_2H_5)]$ (a 1 mol/l solution in hexane) was added and the mixture was allowed to react at a room temperature for 1 day. The polymerization of ethylene in Example 1 was repeated except that the catalyst prepared above was used in lieu of the catalyst of Example 1.

The results of the polymerization were as follows:
Yield of polyethylene: 416 g,
Catalyst efficiency: 4160 g-PE/g-solid catalyst·hr,
MI: 0.08 g/10 min,
FR: 388.

EXAMPLES 6–16

Ethylene was polymerized in the same manner as in Example 1 except that an organomagnesium component and an organoaluminum compound were changed as shown in Table 1.

The results are shown in Table 1.

TABLE 1

| Example No. | Organomagnesium component Composition | A-mount used m mol | Organoaluminum compound Composition | A-mount used m mol | Catalyst efficiency g-PE/g-solid cat·hr | MI g/10 min | FR |
|---|---|---|---|---|---|---|---|
| 6 | $AlMg(n-C_4H_9)_2(C_2H_5)_3$ | 0.1 | — | — | 3300 | 0.21 | 225 |
| 7 | $AlMg_{3.0}(n-C_4H_9)_{4.0}(C_2H_5)_{2.0}(OSiHCH_3C_2H_5)_{3.0}$ | 0.1 | $Al(C_2H_5)_2(OSiHCH_3C_2H_5)$ | 0.1 | 3160 | 0.13 | 240 |
| 8 | $BMg(C_2H_5)_{2.8}(n-C_4H_9)_{2.2}$ | 0.1 | $Al(i-C_4H_9)_{2.5}(OSiHCH_3C_4H_9)_{0.5}$ | 0.15 | 3020 | 0.14 | 265 |
| 9 | $BeMg_{4.0}(C_2H_5)_{3.1}(n-C_4H_9)_{6.8}$ | " | $Al(C_2H_5)_2(OSiHCH_3C_2H_5)$ | 0.1 | 2880 | 0.16 | 248 |
| 10 | $ZnMg_{2.0}(C_2H_5)_{2.1}(n-C_4H_9)_{3.9}$ | " | $Al(C_3H_7)_2(OSiHCH_3C_3H_7)$ | 0.2 | 2980 | 0.11 | 244 |
| 11 | $Li_2Mg(iC_3H_7)_2(n-C_4H_9)_2$ | " | " | " | 2940 | 0.18 | 240 |
| 12 | $AlMg_{3.0}(n-C_4H_9)_{4.5}(C_2H_5)_{3.0}(OSiHCH_3C_2H_5)_{1.5}$ | 0.2 | — | — | 3040 | 0.11 | 285 |
| 13 | $(sec-C_4H_9)_{0.8}Mg(n-C_4H_9)_{0.8}(OSiHCH_3C_4H_9)_{0.4}$ | 0.3 | $Al(C_2H_5)_2(OC_2H_5)$ | 0.1 | 2800 | 0.25 | 200 |
| 14 | — | — | $Al(C_2H_5)_2(OSiHCH_3C_2H_5)$ | 0.1 | 2700 | 0.5 | 90 |
| 15 | $(secC_4H_9)_{1.5}Mg(OnC_4H_9)_{0.5}$ | 0.1 | $Al(C_2H_5)_{2.0}(OSiHCH_3C_2H_5)$ | 0.1 | 3180 | 0.14 | 255 |
| 16 | $(sec-C_4H_9)_{0.8}Mg(n-C_4H_9)_{0.8}(On-C_4H_9)_{0.4}$ | " | $Al(C_2H_5)_{1.5}(OSiHCH_3C_2H_5)_{1.5}$ | 0.1 | 3340 | 0.13 | 260 |

EXAMPLE 17–24

Ethylene was polymerized in the same manner as in Example 1 except that the compounds listed in Table 2 below were used. The results are also shown in Table 2.

TABLE 2

| Example No. | Chromium compound | Zirconium compound | Component B Component | Amount used m mol | Catalyst efficiency g-PE/g-solid cat · hr | MI g/10 min | FR |
|---|---|---|---|---|---|---|---|
| 17 | Chromium nitrate | Zirconium acetylacetonate | $AlMg_{6.0}(C_2H_5)_3(n-C_4H_9)_{12.1}$ + $Al(C_2H_5)_2(OSiHCH_3C_2H_5)$ | 0.15 + 0.05 | 3010 | 0.41 | 211 |
| 18 | t-Butyl chromate | $Zr(OC_3H_7)_4$ | $AlMg_{6.0}(C_2H_5)_3(n-C_4H_9)_{12.1}$ + $Al(C_2H_5)_2(OSiHCH_3C_2H_5)$ | " | 3220 | 0.21 | 260 |
| 19 | Chromium acetate | $Zr(On-C_4H_9)_3Cl$ | $AlMg_{6.0}(C_2H_5)_3(n-C_4H_9)_{12.1}$ + $Al(C_2H_5)_2(OSiHCH_3C_2H_5)$ | " | 3180 | 0.11 | 244 |
| 20 | Chromium trioxide | $Zr(On-C_4H_9)_4$ | $AlMg_{6.0}(C_2H_5)_3(n-C_4H_9)_{12.1}$ + $Al(C_2H_5)_2(OSiHCH_3C_2H_5)$ | " | 3440 | 0.21 | 235 |
| 21 | Chromium acetylacetonate | " | $AlMg_{6.0}(C_2H_5)_3(n-C_4H_9)_{12.1}$ + $Al(C_2H_5)_2(OSiHCH_3C_2H_5)$ | " | 3400 | 0.35 | 220 |
| 22 | Chromium acetylacetonate | " | $Al(C_2H_5)_2(OC_2H_5)$ | 0.1 | 3160 | 0.58 | 225 |
| 23 | Chromium acetylacetonate | " | $Al(C_4H_9)_2(OSiHCH_3C_4H_9)$ | 0.1 | 3260 | 0.56 | 230 |
| 24 | Chromium acetylacetonate | " | $Al(C_2H_5)_{2.25}(OC_2H_5)_{0.5}(OSiHCH_3C_4H_9)_{0.25}$ | 0.1 | 3200 | 0.34 | 212 |

EXAMPLE 25

Example 1 was repeated except that (i) a gas mixture of ethylene and butene-1 containing 2 mol% of butene-1 was used in lieu of ethylene, (ii) isobutane was used in lieu of hexane, and (iii) an ethylene partial pressure of 10 kg/cm², a hydrogen partial pressure of 1 kg/cm² and a total pressure of 23 kg/cm² were used. The results were as follows.

Yield of polymer: 384 g,
Catalyst efficiency: 3840 g-PE/g-solid catalyst·hr,
MI: 0.3 g/10 min,
FR: 200.

EXAMPLES 26–33

The solid catalyst component was prepared in a manner as described in Example 3. Ethylene was polymerized in the same manner as in Example 3 except that the component (B) listed in Table 3 below was used. The results are also shown in Table 3.

TABLE 3

| Example No. | Component [B] Compound | Amount used m mol | Catalyst efficiency g-PE/g-solid cat · hr | MI g/10 min | FR |
|---|---|---|---|---|---|
| 26 | $Al(C_2H_5)_2(OC_2H_5)$ | 0.1 | 3600 | 0.53 | 211 |
| 27 | $Al(C_2H_5)_{1.9}(OC_2H_5)_{1.1}$ | 0.2 | 4000 | 0.66 | 215 |
| 28 | $Al(C_2H_5)_2(OC_2H_5)_{0.5}(OSiHCH_3C_2H_5)_{0.5}$ | 0.1 | 3200 | 0.48 | 206 |
| 29 | $Al(C_2H_5)_2(OC_2H_5)$ + $Al(C_2H_5)_{2.5}(OSiHCH_3C_4H_9)_{0.5}$ | 0.1 + 0.1 | 3050 | 0.55 | 225 |
| 30 | $Al(C_2H_5)_{2.25}Cl_{0.25}(OC_2H_5)_{0.50}$ | 0.2 | 3000 | 0.33 | 203 |
| 31 | $B(C_2H_5)_3$ | 0.1 | 3400 | 0.24 | 220 |
| 32 | $B(C_2H_5)_3$ + $Al(C_2H_5)_2(OC_2H_5)$ | 0.1 + 0.1 | 3600 | 0.26 | 220 |
| 33 | $B(C_2H_5)_3$ + $AlMg(C_2H_5)_3(n-C_4H_9)_2$ | 0.1 + 0.1 | 3740 | 0.20 | 245 |

We claim:

1. A catalyst for polymerizing olefins comprising:
  (A) a solid catalyst component obtained by separately supporting on an inorganic oxide carrier (a) a zirconium compound represented by the general formula:

$Zr(OR^0)_nA_{4-n}$ wherein $R^0$ is a hydrocarbon having 1 to 20 carbon atoms; A is a halogen atom, a carboalkoxy group, a carboxyl group, an acylalkenate, or a hydrocarbon group having 1 through 20 carbon atoms; and n is a number of 0 through 4; and (b) a chromium compound,
  (B) an organometallic compound component.

2. A catalyst as claimed in claim 1 wherein the organometallic compound component (B) is a hydrocarbon-soluble organomagnesium component having the general formula:

$M_\alpha Mg_\beta R^1_p R^2_q X_r Y_s$ wherein M is an element selected from aluminum, boron, beryllium, zinc and lithium; $R^1$ and $R^2$ are the same or different hydrocarbon groups having 1 to 20 carbon atoms; X and Y are the same or different groups selected from $OR^3$, $OSiR^4R^5R^6$, $NR^7R^8$, or $SR^9$ wherein $R^3$, $R^4$, $R^5$, $R^6$, $R^7$, and $R^8$ each independently is a hydrogen atom, or a hydrocarbon group, and $R^9$ is a hydrocarbon group having 1 to 20 carbon atoms; $\alpha > 0$, $\beta > 0$ and p, q, r, and s are each a number zero or greater than zero, and have the relationship of $0 \leq (r+s)/(\alpha+\beta) \leq 1.5$ and $p+q+r+s = m\alpha + 2\beta$ wherein m has a valency of M.

3. A catalyst as claimed in claim 1 wherein the organometallic compound component (B) is comprised of
  (1) a hydrocarbon-soluble organomagnesium component having the general formula:

$M_\alpha Mg_\beta R^1_p R^2_q X_r Y_s$ wherein M is an element selected from aluminum, boron, beryllium, zinc and lithium; $R^1$ and $R^2$ are the same or different hydrocarbon groups having 1 to 20 carbon atoms; X and Y are the same or different groups selected from $OR^3$, $OSiR^4R^5R^6$, $NR^7R^8$, or $SR^9$, wherein $R^3$, $R^4$, $R^5$, $R^7$, and $R^8$ each independently is a hydrogen atom, or a hydrocarbon group, and $R^9$ is a hydrocarbon group having 1 to 20 carbon atoms; $\alpha \geqq 0$, $\beta > 0$ and p, q, r, and s are each a number zero or greater than zero, and have the relationship of $0 \leqq (r+s)/(\alpha+\beta) \leqq 1.5$ and $p+q+r+s = m\alpha + 2\beta$
wherein m has a valency of M,
(2) a component obtained by reacting (i) one mol of a trialkylaluminum compound with (ii) 0.1 to 1 mol of a carbinol having 1 to 10 carbon atoms, or 0.05 to 5 moles of a silanol or siloxane.

4. A catalyst as claimed in claim 1 wherein the organometallic compound component (B) is a component obtained by reacting (i) one mol of a trialkylboron or trialkylaluminum compound with (ii) 0.1 to 1.5 moles of a carbinol having 1 to 10 carbon atoms and/or 0.05 to 2 moles of a silanol or siloxane.

5. A catalyst as claimed in any one of claims 1 through 4 wherein the inorganic carrier is a silica, silica-alumina or alumina carrier.

6. A catalyst as claimed in any one of claims 1 through 4 wherein the catalyst is obtained by supporting the chromium compound and then the zirconium compound on the inorganic oxide carrier, followed by calcination.

7. A catalyst as claimed in any one of claims 1 through 4 wherein the catalyst is obtained by supporting the zirconium compound and then the chromium compound on the inorganic oxide carrier, followed by calcination.

8. A catalyst as claimed in any one of claims 1 through 4 wherein the zirconium compound is represented by the general formula:

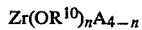

wherein $R^{10}$ is a hydrocarbon group having 1 to 20 carbon atoms, A is a chlorine atom or a hydrocarbon group having 1 to 20 carbon atoms, and n is a number of 0 to 4.

9. A catalyst as claimed in any one of claims 1 through 4 wherein the chromium compound is chromium trioxide, or a compound capable of at least partially producing chromium trioxide by calcination.

10. A catalyst as claimed in any one of claims 1 through 4 wherein the content of the chromium compound in the solid catalyst component is within the range of from 0.01 to 10% by weight in terms of a chromium atom.

11. A catalyst as claimed in any one of claims 1 through 4 wherein the content of the chromium compound in the solid catalyst component is within the range of from 0.1 to 5% by weight in terms of the zirconium compound.

12. A catalyst as claimed in any one of claims 1 through 4 wherein the content of the zirconium compound in the solid catalyst component is within the range of from 0.1 to 10% by weight in terms of the zirconium atom.

13. A catalyst as claimed in any one of claims 1 through 4 wherein the content of the zirconium compound in the solid catalyst component is within the range of from 0.2 to 8% by weight in terms of the zirconium atom.

14. A catalyst as claimed in any one of claims 2 through 4 wherein $\alpha$ and $\beta$ in the general formula of the organomagnesium compound are $\alpha > 0$ and $\beta/\alpha \geqq 0.2$.

15. A catalyst as claimed in any one of claims 2 through 4 wherein $\alpha$ and $\beta$ in the general formula of the organomagnesium compound are $\alpha > 0$ and $\beta/\alpha \geqq 0.5$.

16. A catalyst as claimed in any one of claims 2 through 4 wherein X and Y in the general formula of the organomagnesium component each independently is $OR^3$ or $OSiR^4R^5R^6$.

17. A catalyst as claimed in any one of claims 2 through 4 wherein $\alpha$, $\beta$, r, and s in the general formula of the organomagnesium component are $0 \leqq (r+s)/(\alpha+\beta) \leqq 1$.

18. A catalyst as claimed in any one of claims 2 through 4 wherein $\alpha$, $\beta$, r, and s in the general formula of the organomagnesium component are $0 \leqq (r+s)/(\alpha+\beta) \leqq 0.8$.

19. A catalyst as claimed in any one of claims 2 through 4 wherein X in the general formula of the hydrocarbon-soluble organomagnesium component is an $OSiR^4R^5R^6$ group wherein $R^4$, $R^5$, and $R^6$ are each independently a hydrogen atom or a hydrocarbon group having 1 to 20 carbon atoms.

20. A catalyst as claimed in any one of claims 2 through 4 wherein X in the general formula of the hydrocarbon-soluble organomagnesium component is an $OSiR^4R^5R^6$ group wherein $R^4$ is a hydrogen atom, or $R^4$, $R^5$, $R^6$ are independently a hydrocarbon group having 1 to 7 carbon atoms.

21. A catalyst as claimed in any one of claims 2 through 4 wherein X in the general formula of the hydrocarbon-soluble organomagnesium component is an $OSiR^4R^5R^6$ group wherein $R^4$ is a hydrogen atom, and $R^5$ and $R^6$ are each independently a hydrocarbon group selected from methyl, ethyl, propyl, butyl, amyl, hexyl, phenyl, or tolyl.

22. A catalyst as claimed in any one of claims 1 through 4 wherein the organometallic compound component (B) is a reaction product of trialkylaluminum with silanol or siloxane.

23. A catalyst as claimed in any one of claims 1 through 4 wherein the organometallic compound component (B) contains a Si-H linkage therein.

24. A catalyst as claimed in any one of claims 1 through 4 wherein the organometallic compound component (B) contains 0.1 to 2 moles of a silicon group per 1 gram atom of the metal atom in the component (B).

25. A catalyst as claimed in any one of claims 1 through 4 wherein the solid catalyst component (A) is previously contacted with a small amount of the component (B) prior to the usage thereof.

26. A catalyst according to claim 1, wherein said calcining is conducted in the presence of oxygen.

* * * * *